US007061924B1

(12) United States Patent
Durrant et al.

(10) Patent No.: US 7,061,924 B1
(45) Date of Patent: Jun. 13, 2006

(54) METHODS AND APPARATUS FOR REMOTE METERING

(75) Inventors: Randolph L. Durrant, Colorado Springs, CO (US); Benjamin K. Gibbs, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 894 days.

(21) Appl. No.: 09/866,505

(22) Filed: May 24, 2001

(51) Int. Cl.
*H04L 12/28* (2006.01)
(52) U.S. Cl. .................................. 370/401; 370/315
(58) Field of Classification Search ........ 370/241–253, 370/328, 389, 400, 335, 342, 346, 352, 353, 370/401, 315, 316, 329, 354, 392; 340/870.01, 340/870.14, 870.31, 870.02, 870.19; 455/423, 455/426, 405, 507, 466, 458; 709/223, 224, 709/507; 348/211.3; 705/400, 401, 402, 705/403, 405, 407
See application file for complete search history.

(56) References Cited

U.S. PATENT DOCUMENTS

| | | | | |
|---|---|---|---|---|
| 5,070,536 A * | 12/1991 | Mahany et al. | ........... | 455/67.14 |
| 5,315,580 A * | 5/1994 | Phaal | ........................ | 370/232 |
| 5,451,938 A * | 9/1995 | Brennan, Jr. | ........... | 340/870.14 |
| 5,475,867 A * | 12/1995 | Blum | ........................ | 455/507 |
| 5,751,964 A * | 5/1998 | Ordanic et al. | ........... | 709/224 |
| 5,793,753 A * | 8/1998 | Hershey et al. | ........... | 370/252 |
| 5,822,304 A * | 10/1998 | Brody et al. | ........... | 370/248 |
| 5,892,758 A * | 4/1999 | Argyroudis | ........... | 370/335 |
| 5,974,458 A * | 10/1999 | Abe et al. | ........... | 709/224 |
| 6,006,100 A * | 12/1999 | Koenck et al. | ........... | 455/466 |
| 6,034,623 A * | 3/2000 | Wandel | ........... | 340/870.01 |
| 6,100,817 A * | 8/2000 | Mason et al. | ........... | 340/870.02 |
| 6,246,677 B1 * | 6/2001 | Nap et al. | ........... | 370/346 |
| 6,366,217 B1 * | 4/2002 | Cunningham et al. | . | 340/870.31 |
| 6,512,463 B1 * | 1/2003 | Campbell et al. | ...... | 340/870.02 |
| 6,636,893 B1 * | 10/2003 | Fong | ........... | 709/223 |
| 6,687,499 B1 * | 2/2004 | Numminen et al. | ........ | 455/423 |
| 6,747,571 B1 * | 6/2004 | Fierro et al. | ........... | 340/870.02 |
| 6,748,433 B1 * | 6/2004 | Yaakov | ........... | 709/224 |
| 6,771,606 B1 * | 8/2004 | Kuan | ........... | 370/248 |
| 6,819,655 B1 * | 11/2004 | Gregson | ........... | 370/242 |
| 6,836,737 B1 * | 12/2004 | Petite et al. | ........... | 702/62 |
| 2001/0046230 A1 * | 11/2001 | Rojas | ........... | 370/389 |
| 2002/0039352 A1 * | 4/2002 | El-Fekih et al. | ........... | 370/252 |
| 2002/0061744 A1 * | 5/2002 | Hamalainen et al. | ........ | 455/426 |
| 2002/0094799 A1 * | 7/2002 | Elliott et al. | ........... | 455/405 |
| 2002/0115914 A1 * | 8/2002 | Russ | ........... | 600/300 |
| 2002/0150050 A1 * | 10/2002 | Nathanson et al. | ........ | 370/241 |
| 2002/0167595 A1 * | 11/2002 | Patel et al. | ........... | 348/211.3 |
| 2002/0196789 A1 * | 12/2002 | Patton | ........... | 370/400 |
| 2004/0174847 A1 * | 9/2004 | Menon et al. | ........... | 370/328 |
| 2004/0182936 A1 * | 9/2004 | Koenck et al. | ........ | 235/472.02 |

* cited by examiner

*Primary Examiner*—Phirin Sam
(74) *Attorney, Agent, or Firm*—Blakely, Sokoloff, Taylor & Zafman LLP

(57) ABSTRACT

A monitoring system includes a central gateway. The central gateway is configured to interface the monitoring system to a WAN. The monitoring system also includes a network of radio telemetry devices. Each radio telemetry device includes a monitoring device, a radio module configured to communicate with other radio telemetry devices and the central gateway, and a processor. The radio telemetry device can be configured to acquire monitoring data and forward it to the central gateway. The radio telemetry device can also be configured to relay monitoring data from other radio telemetry devices to the central gateway allowing for the use of short range, low power radio modules.

22 Claims, 6 Drawing Sheets

METHODS AND APPARATUS FOR REMOTE METERING

CROSS REFERENCE TO RELATED APPLICATIONS

This application is related to co-pending U.S. patent application Ser. Nos. 09/398,724, entitled, "DATA TERMINAL APPARATUS", and 09/400,624, entitled "DATA COLLECTION SYSTEM," both filed Sep. 20, 1999, Ser. No. 09/444,020, entitled, "EVENT DETECTION AND NOTIFICATION USING GSM", and Ser. No. 09/444,044, entitled, "OPERATOR INDEPENDENT, TRANSPARENT WIRELESS MODEM MANAGEMENT", both filed Nov. 19, 1999, and Ser. No. 09/524,767, entitled, "DUAL PORT WIRELESS MODEM FOR CIRCUIT SWITCHED AND PACKET SWITCHED DATA TRANSFER," filed May 14, 2000, which are all incorporated herein by reference in their entirety.

BACKGROUND OF THE INVENTION

1. Field of the Invention

This application relates to the field of wireless data transfer technology, and more particularly, to data collection methods and apparatuses using simulated circuit switched technology.

2. Background

Traditionally, power and water companies collect meter data by sending someone around to read meters and collect the data. But this is a costly and time consuming process. Power and water companies need to be more efficient and provide more information to their customers. As a result, various techniques are employed by utility companies to reduce the cost of sending service personal to a physical site.

For example, a simple method is the use of stochastic techniques for extrapolating a measured quantity for a current reading from one or more past values or a moving or seasonal average. This technique is designed to reduce the frequency of meter reading. A disadvantage, however, is the fact that the extrapolated reading can be greatly under or over the actual consumption, such as the case where a consumer is simply not present and no services are used, or when an unusual weather pattern occurs and consumption is significantly increased.

Remote metering is one way to improve customer service. Remote metering allows the utility to obtain more information, more often. The increased amount of information allows the utility to effectively cut costs, provide pricing options, and provide faster service. Remote metering also enables a greater range of metering applications, such as, for example, home energy management systems, home security systems, and vending machine applications.

One remote metering solution is to allow remote meter data collection through a handheld device. This makes data collection somewhat more efficient and makes processing of the data quicker and more reliable. In the Middle East for example, such a system is often employed because service personnel are frequently denied access to a property when the property owner (a man) is not home. The radio based meter reading devices allow service personnel to drive near the radio meter reading device with a receiver device to read the meter. With such technology, service personnel do not need to enter the property. An advantage of such a system is that, in rural areas, the time it takes service personnel to read the meters can be reduced.

For example, one system might require service personnel to physically drive by or near a collection of meter reading devices in order to communicate with the devices. The data collected in the "drive-by" would be later uploaded to a centralized data collection system.

Another solution might include periodic stations that collect wireless data from the devices. The periodic stations, in turn could include a landline modem that communicates with the centralized data collection system by way of circuit switched calls. Such a solution offers an alternative to deploying service personnel, however, setting up phone lines to service the periodic stations can also be expensive. Moreover, circuit switched calls can also be expensive.

The problems mentioned above are exacerbated by deregulation of the utilities industry in the United States. It is now possible for several different suppliers of electricity to service a single metropolitan area. This, in turn, results in a non-contiguous patchwork of service areas that service personnel may have to monitor. No longer can it be assumed that all users in a particular geographic area receive electrical power from a single service provider. Indeed, on a single residential block every household may have a different service provider. Moreover, the alleged ease with which a consumer may switch service providers further complicates the circumstance. Accordingly, the ability to amortize the costs of collecting usage measurements is reduced.

SUMMARY OF THE INVENITON

A monitoring system includes a central gateway. The central gateway is configured to interface the monitoring system to a WAN. The monitoring system also includes a network of radio telemetry devices. Each radio telemetry device includes a monitoring device, a radio module configured to communicate with other radio telemetry devices and the central gateway, and a processor.

In one embodiment, the processor is configured to receive monitoring data from the monitoring device, receive a command to establish a circuit switched data communication with the network-based monitoring application from the monitoring device, and establish a packet data connection with the network-based monitoring application through the monitoring system using the radio module.

In another embodiment, each radio telemetry devices can be configured to extend the range of the monitoring system by communicating with other radio telemetry devices. In this case, the processor can be configured to receive monitoring data from other radio telemetry devices and to relay the information along until it reaches the central gateway.

In another embodiment, specialized radio telemetry devices can be included, the only purpose of which is to relay information within the monitoring system. This relaying capability that can be incorporated into both the radio telemetry devices just described as well as the specialized radio telemetry devices allows for the use of low power, low cost radio modules.

Other aspects, advantages, and novel features of the invention will become apparent from the following Detailed Description of Preferred Embodiments, when considered in conjunction with the accompanying drawings.

BRIEF DESCRIPTION OF THE DRAWINGS

In the figures of the accompanying drawings, like reference numbers correspond to like elements.

DETAILED DESCRIPTION OF THE PREFFERED EMBODIMENTS

Figure 1:
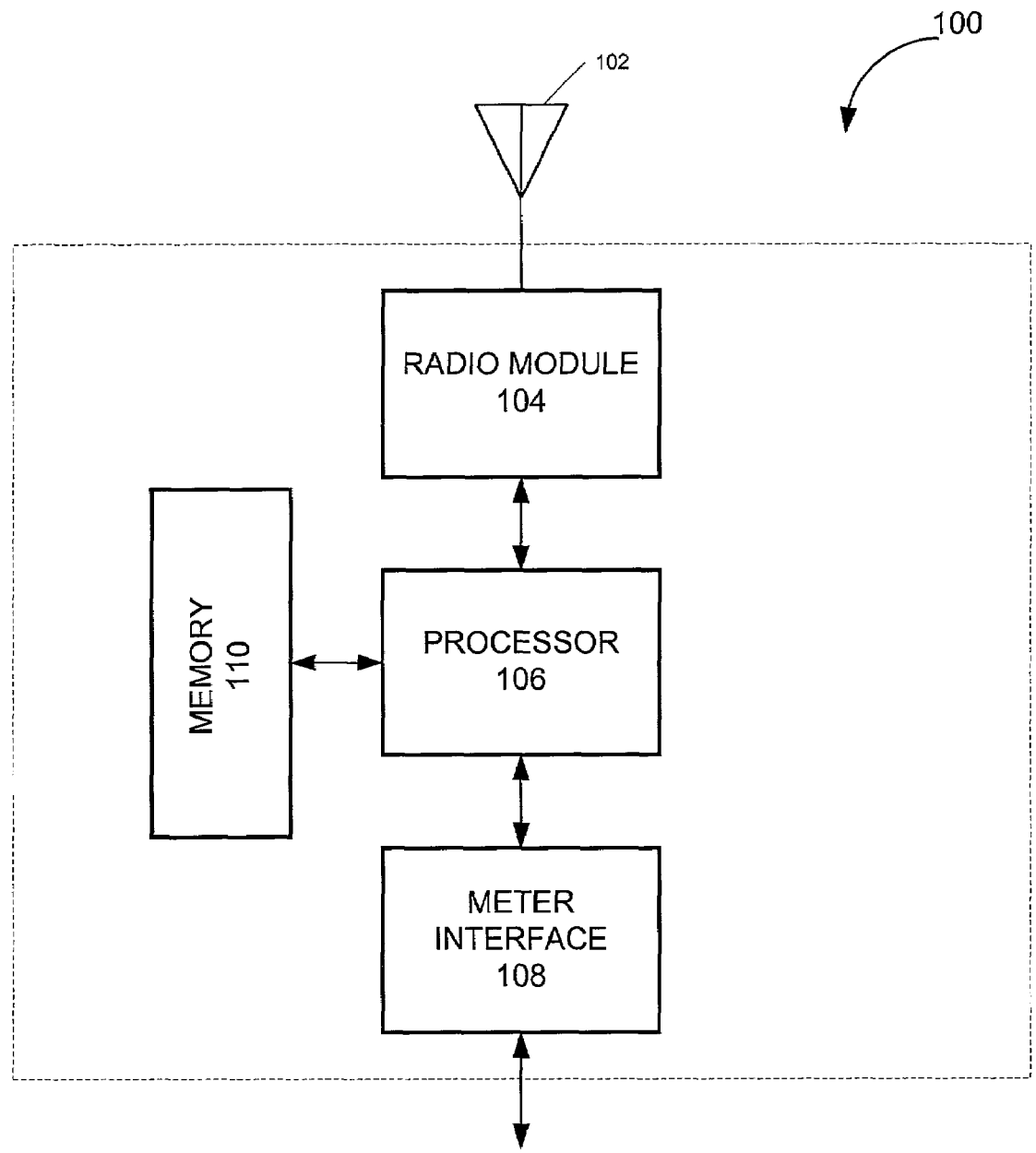
FIG. 1 depicts a first embodiment of a radio telemetry device in accordance with the invention.

FIG. 1 illustrates a radio telemetry device 100 in accordance with one embodiment of the invention. Device 100 is employed within a system for remotely collecting data from a plurality of meters. In such a system, a meter is interfaced with a radio telemetry device 100. Each device 100 includes an antenna 102, a radio module 104, a processor 106, a meter interface 108, and a memory 110. Device 100 interfaces with a meter through meter interface 108. Processor 106 controls radio module 104.

It should be noted that the monitoring devices (not shown) and device 100 can be incorporated into one device or unit depending on the implementation.

Radio module 104 includes a receiver for receiving radio signals encoded with command and control data or with meter data broadcast/relayed through another device 100. Radio module 104 also includes a transmitter for transmitting radio signals encoded with command and control data or meter data. Note that the meter data transmitted by radio module 104 can be the meter data collected through meter interface 108, or it can be the meter data received by radio module 104. Radio module 104 is coupled to antenna 102, which is the mechanism through which radio module 104 transmits and receives radio signals.

There are a variety of methods for collecting meter data through meter interface 108. Any of these methods can be used in conjunction with the methods and apparatus for remote metering.

Memory 110 is used to store software instructions used by processor 106. These instructions include the application software that processor 106 uses to interface to the meter, as well as radio control and communication software. The radio control software is used to control radio module 104. This "layer" of software defines protocols used for radio channel access within the system. The communication layer preferably comprises some type of packet based networking protocol that allows the meter data to be communicated from device to device. This layer of software sits on top of the radio control layer.

Many software protocols can be implemented for the radio and communication software layers. Furthermore, there are several other layers that may or may not be included to implement a system that utilizes a plurality of devices 100 to communicate meter data and command and control data. Some of these options are discussed with respect to examples that follow. But, these examples should not be read to limit the invention to particular protocols or to the use of particular layers.

Figure 2:
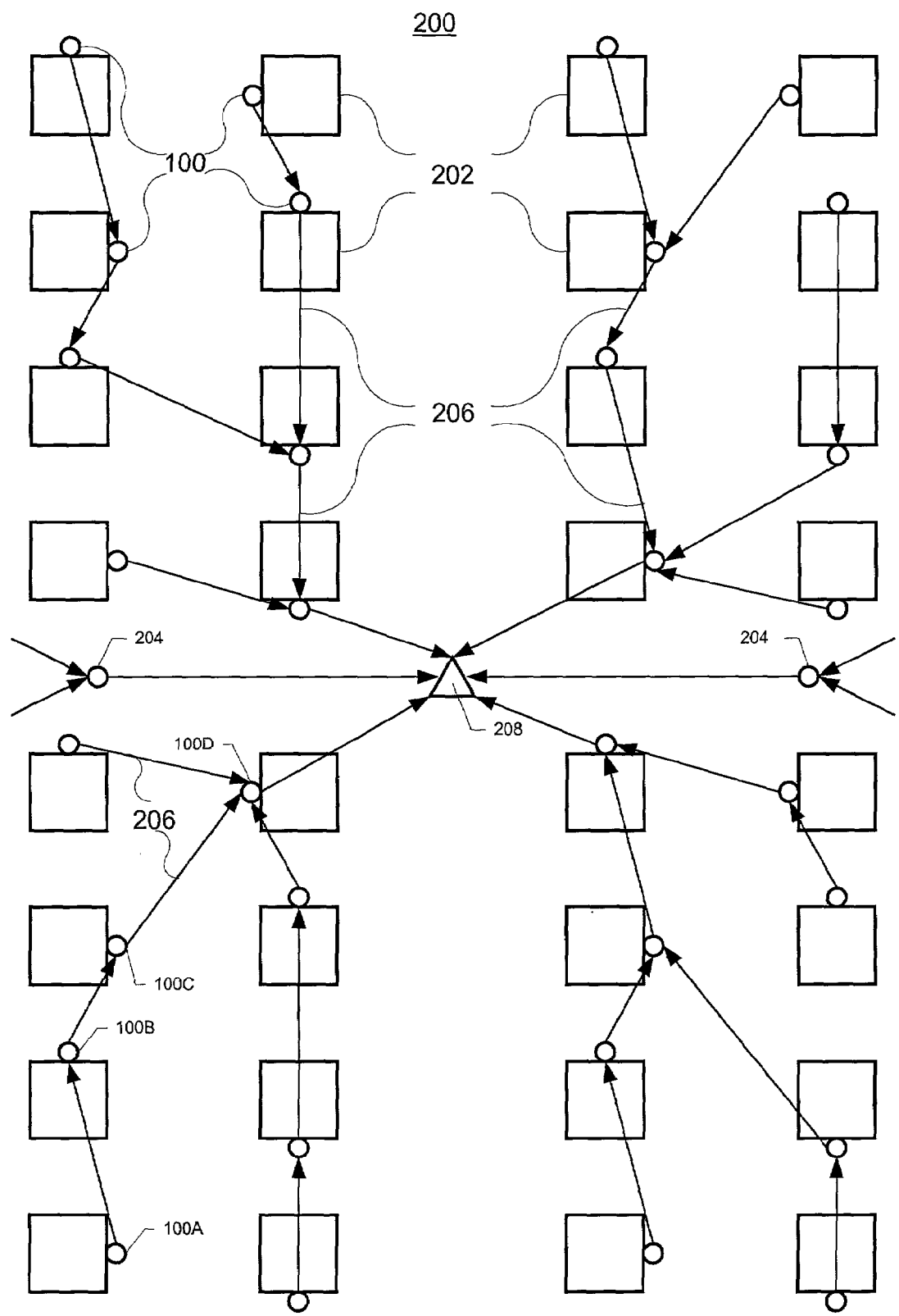
FIG. 2. depicts one embodiment of a remote metering system that uses the radio telemetry device of FIG. 1 in accordance with the invention.

FIG. 2 illustrates a remote metering system 200 in accordance with one embodiment of the invention. System 200 comprises a plurality of radio telemetry devices 100 installed at a plurality of residences 202. Each device 100 is capable of relaying meter data and command and control data to and from other devices 100, and ultimately to central gateway 208. To relay data, a device 100 receives and then re-transmits the data using radio module 104. The relaying of the data is illustrated by links 206 in FIG. 2. For example, meter data collected by device 100A is transmitted to device 100B. Device 100B relays the meter data to device 100C, which relays the data to device 100D. Device 100D then relays the data to central gateway 208. In this manner, system 200 can be extended over long distances.

Figure 3:
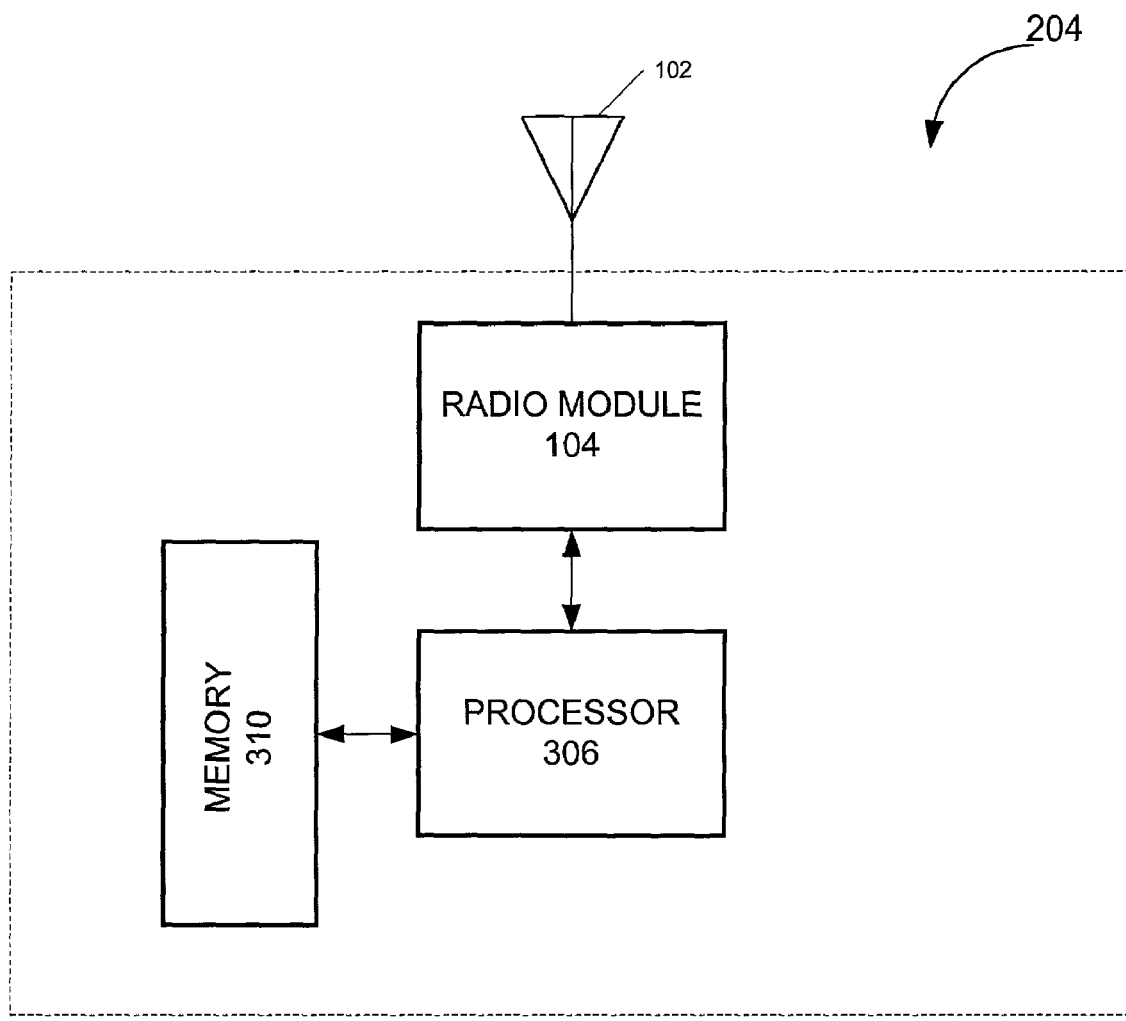
FIG. 3 depicts a second embodiment of a radio telemetry device in accordance with the invention.

To further extend the reach of system 200, modified radio telemetry devices 204 can also be employed. Devices 204 are dedicated to relaying data and, as illustrated in FIG. 3, do not link to meters directly. Thus, device 204 includes an antenna 102, a radio module 104, a processor 306, and memory 310, but does not include a meter interface 108. The reach of system 200, therefore, is only limited by the availability of radio telemetry devices 100 and modified radio telemetry devices 204.

The relaying capability of devices 100 and 204 reduce the range required of the transmitter portion of radio module 104. This allows short range, low power transmitters to be used in radio module 104. One example of a short-range low power transmitter is defined in volume I of "The Specification of the Bluetooth™ System," which is incorporated herein by reference in its entirety. The Bluetooth™ specification defines a universal radio interface that uses frequency map (FM) spread spectrum techniques and operates in the Industrial-Scientific-Medical (ISM) band. Bluetooth™ transmitters are capable of up to 100 mW of transmit power and ranges of 100 m.

Another example of a short range, low power transmitter is a HomeRF™ transmitter as defined in the Shared Wireless Access Protocol (SWAP) specification, which is incorporated herein by reference in its entirety. A HomeRF™ transmitter also operates in the ISM band but uses time division multiple Access (TDMA) for voice and time critical services and Carrier Sense Multiple Access/Collision Avoidance (CSMA/CA) for delivery of high speed packet data. A HomeRF™ transmitter is also capable of 100 mW transmit power and can deliver data at 1 Mbs or 2 Mbs.

Therefore, certain embodiments of radio module 104 can conform to the Bluetooth™ specification and certain embodiments can conform to the HomeRF™ specification; however, the above examples should not be viewed as limiting the invention. The invention will work equally well with any short range, low power radio module.

The Bluetooth™ specification defines a unique networking capability that makes it particularly adaptable to ad hoc networking. For example, Bluetooth™ units that are within range of each other can set up connections to form piconets on an ad hoc basis. A piconet consists of up to eight Bluetooth™ units. To regulate traffic over the connection, one of the participants becomes a master of the piconet. Typically, the unit that establishes the piconet assumes the role of master. The master then polls each slave for any data to be transmitted by the slave. If the slave has data, i.e. meter data, to communicate, then the slave will send the data in a channel communication slot immediately following the polling message from the master. A clock inside the master controls communication timing for the whole piconet. Each unit, however, has its own free-running, native clock as well. When a connection is established, a clock offset is added to synchronize the slave native clocks with the master clock. But the native clocks are never adjusted and the offset is used solely for the duration of the connection.

Figure 4:
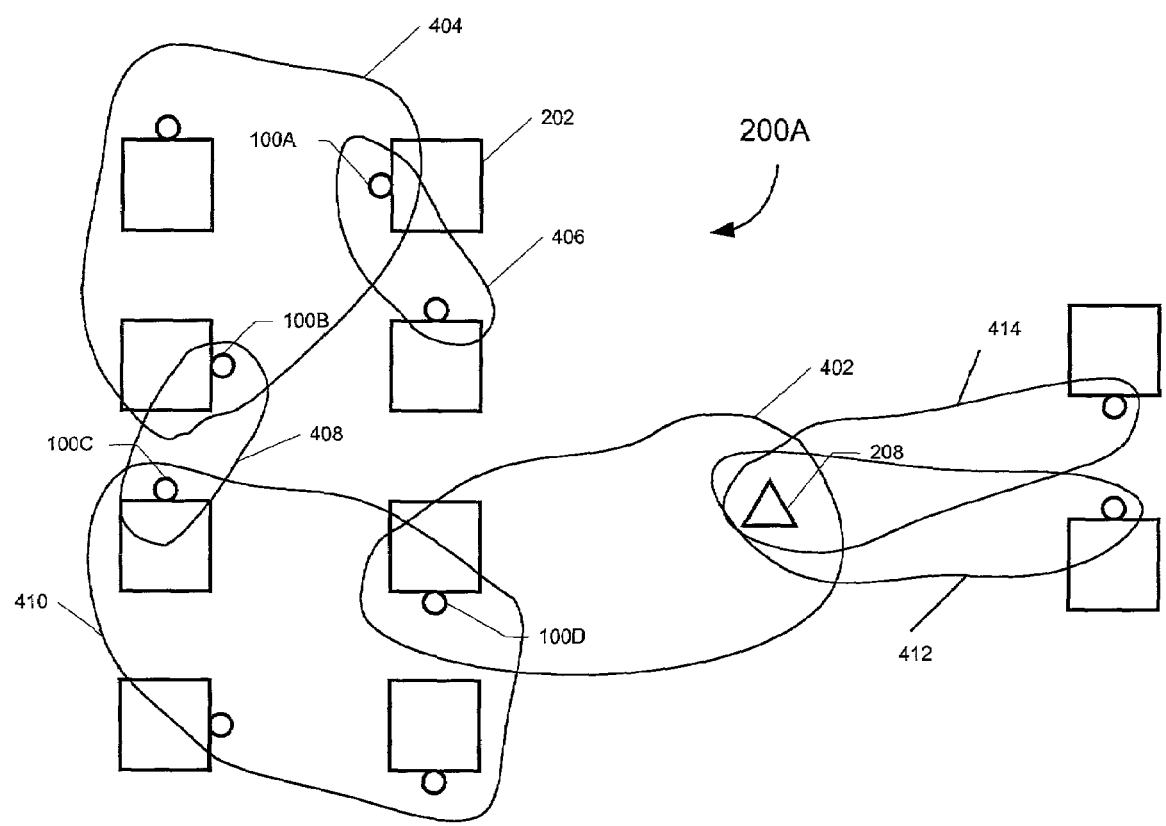
FIG. 4 depicts one embodiment of a remote metering system using ad hoc networking in accordance with the invention.

A portion of system 200A that implements piconets is illustrated in FIG. 4. The telemetry devices 100 are formed into piconets 402, 404, 406, 408, 410, 412, and 414. To facilitate the ultimate communication of meter data to central gateway 208, and command and control data to any of the various devices 100, devices 100A, 100B, 100C and 100D belong to more than one piconet. Thus, system 200A takes advantage of the fact that Bluetooth™ permits several piconets to be created that have overlapping areas of coverage. A group of such piconets is called a scatter net. Devices 100A, 100B, 100C and 100D can be masters or slaves in each piconet to which they belong, independent of the role they play in the other piconets to which they belong. It should also be noted that central gateway 208 will typically belong to several piconets, in this case 402, 412, and 414.

If a Bluetooth™ or HomeRF™ radio module is used, then the radio control protocol will also be defined by the respective specifications. In order for a system such as system 200 to operate, however, the various devices 100 and 204 must be able to "link" to one another. While the ability to link is controlled by factors such as transmitter power and receiver sensitivity, it also requires an appropriate communication or networking protocol. One of the most common networking protocols is the Internet Protocol (IP). An explanation of IP is provided in RFC 791 "DARPA Internet Program Protocol Specification," October 1981, which is incorporated herein by reference in its entirety.

Originally developed for the Internet, IP is designed for use in interconnected systems of packet-switched computer communication networks. IP is a method by which data is sent from one host to another within the network. Each host has at least one address that uniquely identifies it from all other hosts. When a host sends or receives data, the data gets divided into packets. Each packet contains both the sender's address and the receiver's address. In system 200, when meter data is being sent by a device 100, for example, the receiver's address is always the address that corresponds to central gateway 208.

IP is a connectionless protocol, so there is no dedicated path between sender and receiver. Each packet travels through the network as an independent unit of data that is unrelated to any other unit of data travelling in the network. Therefore, a connection-oriented protocol is needed that keeps track of the packet sequences, and reassembles them in the correct order once they reach their destination. This software layer resides on top of the communication layer. The most common connection-oriented protocol used in conjunction with IP is the Transmission Control Protocol (TCP). Thus, when an embodiment of system 200 uses IP as the network protocol, the system will also preferably use TCP as the connection-oriented protocol.

In the Internet, each packet is first sent to a gateway computer that understands a small part of the Internet. The gateway computer reads the destination address and forwards the packet to an adjacent gateway computer that in turn reads the address of the destination. Once the packet reaches a gateway computer that recognizes the packet as belonging to a computer within its immediate range or domain the gateway computer forwards the packet directly to the computer whose address is specified. Therefore, in system 200, each device 100 must be capable of operating as a host for generating and receiving data and each of devices 100 and 204 must be capable of acting as a gateway computer ("gateway") for relaying data.

In a system, such as system 200, a gateway contains a routing table of how to get to each device on its network. This would be a list or chain of IP addresses that show the route. Explicit source IP routing is used to send data from the gateway to the end device. Each non-gateway device also contains a routing table that contains the next-hop IP address that will lead back to the gateway. This address can be set manually by the network administrator or can be generated automatically by a gateway discovery algorithm. One algorithm is for the end device to request each adjacent node in turn to try to send data to the gateway.

For example, if Bluetooth™ radio modules are used, than a device joins a network first through the Bluetooth™ protocol and gets established in a piconet configuration. Each device knows who its master is for the piconet. This master is the default gateway for all traffic from the device. The piconets can then be formed into one large scatter net. One of the piconet masters will then also function as the scatter net master or scatter net gateway. The scatter net gateway can be, for example, central gateway 208.

Initially, a device does not have to know the IP address of its piconet master, it just sends a control message to it saying "I'm new and I need an IP address from the gateway." This message includes the device's Bluetooth™ address (essentially similar to an Ethernet IEEE 802 MAC address). The master then sends the request to its master. In this fashion, the request is relayed from master to master, i.e., gateway to gateway, all the way back to the scatter net gateway.

At each hop, the relaying device adds its IP address to the request, thus creating an explicit path back to the requesting master. This indicates that a scatter net has formed with no gateway. The scatter net gateway device eventually receives the request and selects an unused IP address from a pool of addresses allocated to it for the new node. If the requesting node already has an IP address allocated to it (for example, the node has moved), the same IP address can be allocated but the route to that device is updated. Also, if that node was a master to other devices and the routes have not already been reassigned, the routes to those devices will now be made invalid and removed from the routing table.

The scatter net gateway notes the new node IP address, the associated Bluetooth™ MAC address, and the explicit IP address route that was contained in the message in its routing table. It then sends the IP address allocation message back to the original requesting master using the explicit IP address route. This allocation message includes the original Bluetooth™ address so it is unique for one device. Each receiving node looks at the IP packet and forwards the packet to the next address in the list. The master at the end of the route receives the address allocation packet, adds the newly allocated address to its own routing table (each master contains a list of all its slave's IP addresses) and issues the IP address allocation message to the new device using the Bluetooth™ address contained within as its reference. The new device then configures itself with the new IP address.

If a device is separated from its master, either because it moves out of range, or it is power cycling, or for any other reason, the Bluetooth™ protocol will cause the device to try and establish new links with the scatter net. Once it is reconnected to the scatter net, a new master is identified. The device will then reissue its request for an IP address to its new master and try to re-establish a route back to the scatter net gateway.

This system described above is a simple implementation. For example, it assumes that scatter nets will grow outward from the gateway. Also, it does not take into account the creation of routing loops, where piconets could be created and where successive masters are slaves in each other's piconet and there is no route to the main gateway. For this reason, preferred embodiments use peer discovery algorithms and routing algorithms. The IETF Mobile Ad Hoc Networking (MANET) working group has a number of Internet drafts of various routing algorithms that can be used. A sample of these drafts is listed below:

Ad Hoc On Demand Distance Vector (AODV) Routing;
Temporally-Ordered Routing Algorithm (TORA) Version 1 Functional Specification;
The Dynamic Source Routing Protocol for Mobile Ad Hoc Networks;
Optimized Link State Routing Protocol; a Topology Broadcast based on Reverse-Path Forwarding (TBRPF);
Landmark Routing Protocol (LANMAR) for Large Scale Ad Hoc Networks;
A Simple Protocol for Multicast and Broadcast in Mobile Ad Hoc Networks;
Fisheye State Routing Protocol (FSR) for Ad Hoc Networks;
The Interzone Routing Protocol (IERP) for Ad Hoc Networks;
The Intrazone Routing Protocol (IARP) for Ad Hoc Networks;
The Bordercast Resolution Protocol (BRP) for Ad Hoc Networks; and
Flow State in the Dynamic Source Routing Protocol for Mobile Ad Hoc Networks.

As a result, certain embodiments use the networking protocol defined by MANET, which is explained in "Mobile Ad Hoc Networking (MANET): routing protocol Performance Issues and Evaluation Considerations," January 1999, which is incorporated herein by reference in its entirety. A MANET consists of a system of nodes, which are free to move about arbitrarily. The system may operate in isolation or may have a gateway to and interface with a fixed network. For example, in system 200, central gateway 208 can operate as a gateway to a fixed network. Although, central gateway 208 is preferably an interface to a wireless communication system as opposed to a fixed network, the wireless communication system can provide access to a fixed network if required. Central gateway 208 is discussed in more detail below.

In a MANET, at any given point in time, wireless connectivity in the form of a random, multi-hop graph or "ad hoc" network exists between the nodes. For example, the nodes may be radio telemetry devices 100 and 204 within a system 200 implemented as a MANET. This ad hoc topology may change with time as the nodes move, adjust their transmission and reception parameters, or when nodes are added and deleted. Therefore, as devices 100 or 204 are added, deleted, or moved within system 200, the ad hoc nature of MANET will adjust.

Due to the ad hoc nature, radio module 104 can preferably be a Bluetooth™ transceiver when system 200 is implemented as a MANET.

By using short range, low power radio modules and ad hoc networking, many of the drawbacks of conventional telemetry systems can be overcome. For example, the range of such systems can be increased and the cost of the hardware needed to implement them can be reduced. Further, the dynamic nature of such systems can be accounted for through the adaptability of the ad hoc approach.

using packet based communication, such as TCP/IP, can also overcome the drawbacks inherent in circuit switched communication within telemetry systems. For example, in system 200, where each device 100 is responsible for one meter. Each device can be assigned an IP address that can be read by a network-based meter reading application. This meter reading application resides on a network interfaced with system 200 through central gateway 208. The meter reading application can requests a connection to device 100 using a standard TCP/IP connection. When a connection is made to device 100, or more specifically processor 106, it in turn issues initialization commands to the meter through interface 108. Interface 108 is preferably an RS-232 interface and the commands sent through it are preferably AT commands. Once the meter is initialized, the network-based meter reading application will issue commands to the meter directly (relayed by the processor 106) to read the values stored in the meter.

The application is also able to configure the meter. Such configurations include—the number that the meter should call in case of an alert and parameters that may cause an alert, for example, if the number of electrical units consumed goes over a certain threshold. When an alert occurs, the meter will issue an AT command to device 100 through interface 108 to try and establish a circuit switched data call to the network via radio module 104. If this occurs, the processor will establish a TCP/IP connection with the network-based meter reading application, which will then issue a "CONNECT" message back to the meter. The circuit-switched data call can then be simulated over the ad-hoc packet network. An example technique for simulating a circuit switched call over a packet data network is shown in FIGS. 13A–13C of cross-referenced U.S. application Ser. No. 09/400,624 and described in the accompanying specification. Simulating the circuit switched call through the packet based connection can reduce the costs associated with the calls themselves and/or the cost of setting up phone lines.

It should be noted that, not all meters are necessarily capable of creating alerts and some meters can be "dumb," in which case they do not require initialization commands. Dumb meters work on the assumption that the meter reading is being controlled by a device connected directly to the meter as opposed to being controlled by a network meter reading application via radio module 104.

The connection to the network-based meter reading application does not necessarily need to be a TCP/IP connection. Any packet based network connection that can be used to simulate a circuit switched data call in the manner discussed will be sufficient.

Figure 5:
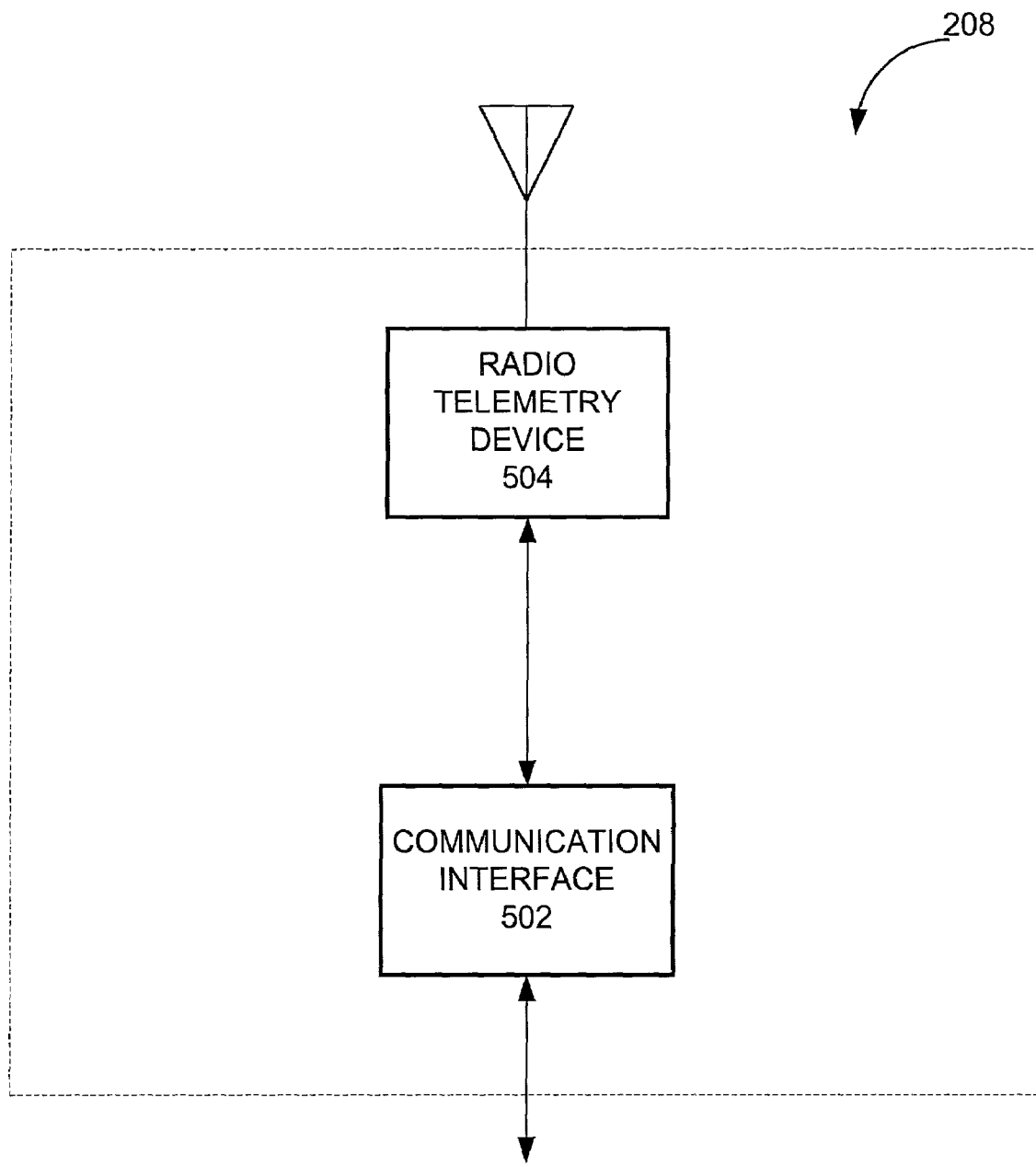
FIG. 5 depicts one embodiment of a central gateway in accordance with the invention.

A typical embodiment of a central gateway 208 is illustrated in FIG. 5. Central gateway 208 comprises a radio telemetry device 504 and a communications interface 502. Because central gateway 208 does not need to interface to a meter, device 504 is preferably something similar to a modified radio telemetry device 204. Communication interface 502 interfaces central gateway 208 to a network through which the meter data is communicated to the meter reading application. Command and control data can also be routed through the network to central gateway 208, which then transmits the information to the remote metering system via device 504.

A wireless communication system, the PSTN, the Internet, or some other Wide Area Network (WAN), are examples of networks that central gateway 208 can interface to through communication interface 502. For example, if the central gateway interfaces to a GSM wireless communication network, interface 502 can include a GSM radio interface such as a Redhawk 2000 radio.

In embodiments where central gateway 208 is interfaced to a wireless communication system, such as a GSM system, there are several packet based protocols by which the data can be communicated to the end user. For example, the wireless communication system may use packet switched data technology such as General Packet Radio Service (GPRS) or EDGE service or cdma2000™ 1×RTT or HDS service. In embodiments where the network is not a wireless communication system, the meter data is communicated to the end user in accordance with the methods and protocols associated with the particular network.

Figure 6:
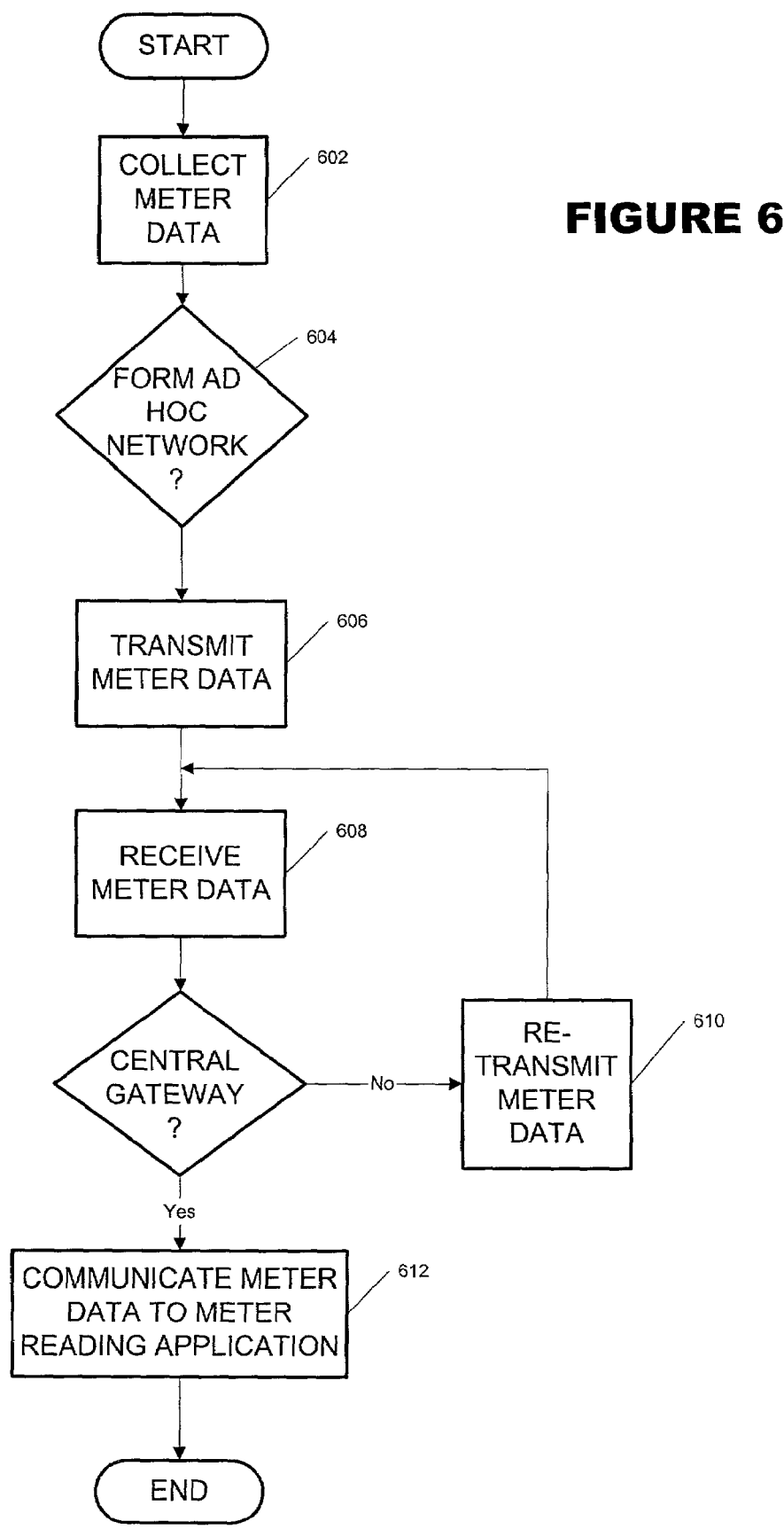
FIG. 6 is a flow diagram illustrating a method of remote metering in accordance with one embodiment of the invention.

The process by which system 200 remotely collects meter data and communicates it to an end user is illustrated in FIG. 6. In step 602, a radio telemetry device 100 collects the meter data. In order to communicate the data to a network-based meter reading application connected to central gateway 208, remote telemetry device 100 can form an ad hoc network with other radio telemetry devices 100 in step 604. Alternatively, remote telemetry device 100 can be part of a fixed network of remote telemetry devices. After step 604 is performed, radio telemetry device 100 transmits the meter data in step 606. Then, in step 608, the meter data is received. If the meter data is received by a central gateway 208, then the meter data can be forwarded to the meter reading application as discussed above, in step 612. If, on the other hand, the meter data is received by another radio telemetry device 100 or 204, then the meter data is retransmitted in step 610 until the meter data does reach a central gateway 208, at which point it is forwarded to the meter reading application (step 612).

It should be noted that although residential meters were used as the basis for the embodiments discussed, this was by way of example only. The invention will work equally well with any remote monitoring system, such as a system of vending machines. In this case, the meter data will be replaced by the monitoring data for whatever is being monitored in the system and the remote metering application can be described more generically as a remote monitoring application. Therefore, the above examples are not intended to limit the invention in any way.

What is claimed is:

1. A monitoring system, comprising:
a central gateway configured to interface with the monitoring system to a WAN; and
a network of monitoring devices, the network being established on an ad hoc basis, each monitoring device having a meter interface to acquire monitoring data from a meter, and a radio interface to transmit the acquired monitoring data to the central gateway, to receive monitoring data from other monitoring devices, and to relay the received monitoring data to the central gateway.

2. The monitoring system of claim 1, wherein the network of monitoring devices further comprises a plurality of intermediate devices to relay data within the monitoring system.

3. The monitoring system of claim 2, wherein the monitoring devices, intermediate devices, and the central gateway comprise short range, low power radio modules.

4. The monitoring system of claim 1, wherein the central gateway forwards the monitoring data to a network-based monitoring application that resides on or is interfaced to the WAN.

5. The monitoring system of claim 4, wherein the network-based monitoring application is configured to send configuration data to an individual monitoring device in the network of monitoring devices trough the central gateway.

6. The monitoring system of claim 1, wherein communication between monitoring devices in the network of monitoring devices and between the network of monitoring devices and the central gateway occurs over packet based communication links.

7. The monitoring system of claim 1, wherein the central gateway is configured to interface the monitoring system to the WAN over a wireless communication interface.

8. A monitoring system, comprising:
a central gateway configured to interface the monitoring system to a network-based monitoring application; and
a network of radio telemetry devices, each radio telemetry device comprising:
a monitoring device,
a radio module configured to communicate with other radio telemetry devices and the central gateway, and
a processor coupled with the radio module and the monitoring device, the processor:
receiving monitoring data from the monitoring device,
receiving a command to establish a circuit switched data communication with the network-based monitoring application from the monitoring device, and
establishing a packet data connection with the network-based monitoring application through the central gateway using the radio module in response to the received command; and
a plurality of interconnecting networks of radio telemetry devices, at least some of the plurality of interconnecting networks being formed on an ad hoc basis.

9. The monitoring system of claim 8, wherein the network-based monitoring application is configured to establish a packet data communication with at least some of the radio telemetry devices through the central gateway in order to access monitoring data and/or configure the monitoring device portion of the radio telemetry devices.

10. The monitoring system of claim 8, wherein the network of radio telemetry devices includes modified radio telemetry devices dedicated to relaying data within the monitoring system.

11. A radio telemetry device, comprising:
a monitoring device,
a radio module to communicate with other radio telemetry devices and a central gateway, and
a processor coupled with the radio module and the monitoring device, the processor:
receiving monitoring data from the monitoring device,
receiving a command to establish a circuit switched data communication with a network-based monitoring application from the monitoring device, and
establishing a packet data connection with the network-based monitoring application through a central gateway using the radio module in response to the received command;
wherein the radio telemetry device is configured to join a network of radio modules on an ad hoc basis.

12. The radio telemetry device of claim 11, wherein the network-based monitoring application is configured to establish a packet data communication with the radio telemetry device through the cent gateway in order to access monitoring data and/or configure the monitoring device.

13. The radio telemetry device of claim 11, further configured to relay monitoring data from other radio telemetry devices to the central gateway so that it can be forwarded to the network-based monitoring application.

14. The radio telemetry device of claim 11, wherein the radio module is a Bluetooth radio module.

15. The radio telemetry device of claim 11, wherein the radio module is a Home RF radio module.

16. The radio telemetry device of claim 11, wherein the radio module is a short range, low power radio module.

17. The radio telemetry device of claim 11, configured to be part of a plurality of interconnected networks of radio telemetry devices.

18. A radio telemetry device, comprising:
a monitoring interface to interface the device to a monitoring device;
a radio module to communicate with other radio telemetry devices and to a central gateway; and
a processor coupled with the monitoring interface and with the radio module, the processor:
receiving monitoring data through the monitoring interface,
transmitting the monitoring data to the central gateway using the radio module,
receiving monitoring data from other radio telemetry modules using the radio module, and
transmitting the received monitoring data to the central gateway using the radio module;
wherein the radio telemetry device is configured to be part of network of radio telemetry devices, the network being formed on an ad hoc basis.

19. The radio telemetry device of claim 18, wherein the radio module is a short range, low power radio module.

20. A method of radio telemetry using a monitoring device configured to operate in a network of monitoring devices, comprising:
acquiring monitoring data;
receiving a command to establish a circuit switched data communication with a network-based monitoring application;
establishing a connection to a network of radio telemetry devices on an ad hoc basis; and
establishing a packet data connection with the network-based monitoring application through the established ad hoc network of radio telemetry devices in response to the command to establish a circuit switched data communication.

21. The method of claim 20, further comprising:
receiving monitoring data from another radio telemetry device or from a modified radio telemetry device; and
transmitting the received monitoring data to another radio telemetry device or to a modified radio telemetry device in the network of radio telemetry devices or to a central gateway.

22. The method of claim 20, further comprising:
receiving configuration or other command and control data from another radio telemetry device, from a modified radio telemetry device, or from the central gateway; and
transmitting the received configuration or other command and control data to another radio telemetry device or to a modified radio telemetry device in the network of radio telemetry devices.

* * * * *